Dec. 30, 1924.
L. N. BROOKS
1,521,272
GREASE GUN ATTACHMENT
Filed Dec. 18, 1923
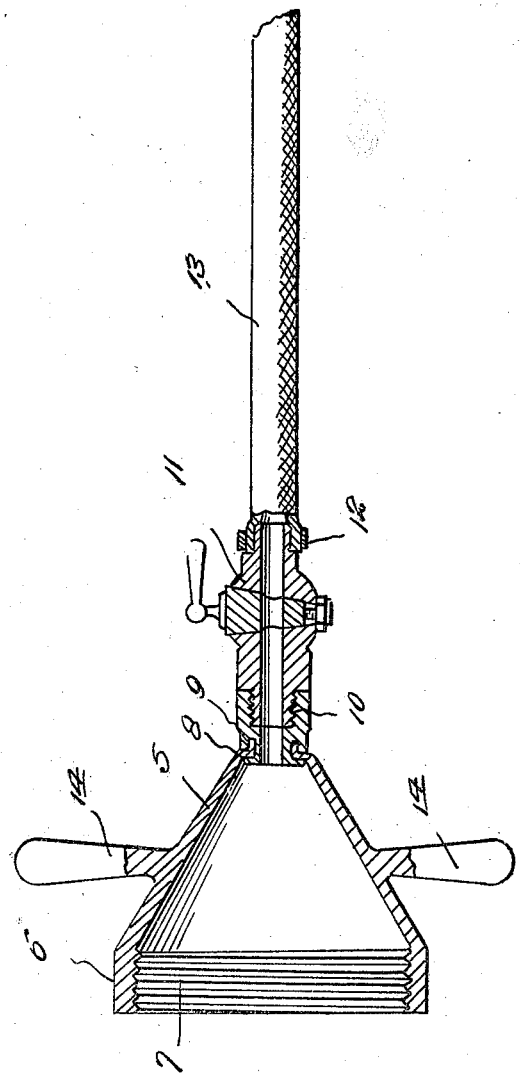
L. N. Brooks,
Inventor Patented Dec. 30, 1924.

1,521,272

UNITED STATES PATENT OFFICE.

LAWRENCE N. BROOKS, OF CHAMBERLAIN, SOUTH DAKOTA.

GREASE-GUN ATTACHMENT.

Application filed December 18, 1923. Serial No. 681,428.

*To all whom it may concern:*

Be it known that I, LAWRENCE N. BROOKS, a citizen of the United States, residing at Chamberlain, in the county of Brule and State of South Dakota, have invented certain new and useful Improvements in Grease-Gun Attachments, of which the following is a specification.

This invention relates generally to grease guns and has more particular reference to an attachment therefor, whereby the bearings of vehicle wheels may be advantageously and quickly greased, the primary object of the invention residing in the provision of such an attachment that may be manufactured and marketed at a relatively small cost and one that may be associated with practically all types of grease guns now upon the market.

With the above and other objects in view as the nature of the invention will be better understood, the same comprises the novel form, combination and arrangement of parts of a grease gun attachment hereinafter more fully described, shown in the accompanying drawings and claimed.

In the drawing wherein there is disclosed the most practical embodiment of the invention with which I am at this time familiar: the figure is a longitudinal sectional view of a grease gun attachment constructed in accordance with the present invention.

Now having particular reference to the drawing, my novel attachment for grease guns embodies the provision of a metal cup 5 that is open at its opposite ends, the enlarged open end of said cup terminating in a horizontal portion 6 that is internally screw-threaded as at 7. The contracted open end of said cup 5 is swivelly connected as at 8 to one end of a nipple 9 that is formed with a longitudinal passage, the inner end of which is relatively enlarged and screw-threaded for the reception of the usual screw-threaded outlet nipple 10 of a well known form of cut-off cock 11. To the inlet nipple of this cock, there is connected as at 12, one end of a flexible hose 13, the other end thereof being connected to the outlet of the grease gun, not shown.

The cup 5 is provided with a plurality of right angularly extendig operating knobs 14, and in actual practice, the hub caps of the vehicle wheels are removed after which the cock 5 is engaged with the hub of the wheel, and whereby after the pet cock has been opened, grease may be injected into the hubs through the medium of the grease gun employed in conjunction with the present invention.

It will thus be seen that I have provided a highly novel and useful form of grease gun attachment whereby wheel bearings may be effectively and easily supplied with lubricant.

I have shown in the drawing and set forth in the specification, a particular form of grease gun attachment, but it is nevertheless to be understood that minor changes may be made in the invention without departing from the spirit and scope of the appended claims.

Having thus described my invention, what I claim as new and desire to secure by Letters Patent is:—

1. In an attachment for grease guns, a cut-off valve, a cup shaped member swivelly connected to the outlet nipple of said valve and being internally screw-threaded at its opposite end whereby the same may be positioned upon the hub of a vehicle wheel, and means at the inlet nipple of said valve for attachment to a grease gun for the purposes described.

2. In an attachment for grease guns, a cut-off cock, a conical shaped cup member swivelly connected to the outlet nipple of the cock and being formed at its opposite end with internal screw-threads, handle members carried by said cup whereby the same may be readily positioned upon the hub of a vehicle wheel, and a flexible hose connected at one end to the inlet nipple of said cock and adapted to be connected at its opposite end to the outlet of said grease gun.

In testimony whereof I affix my signature.

LAWRENCE N. BROOKS.